United States Patent [19]

Bederke et al.

[11] Patent Number: 5,661,199
[45] Date of Patent: Aug. 26, 1997

[54] HYDROXYL GROUP CONTAINING BINDER, A PROCESS FOR ITS PREPARATION, AND ITS USE

[75] Inventors: Klaus Bederke; Hermann Kerber, both of Wuppertal; Ralf Dahm, Wermelskirchen; Friedrich Herrmann; Horst Voss, both of Wuppertal, all of Germany

[73] Assignee: Herberts Gesellschaft mit beschrankter Haftung, Wuppertal, Germany

[21] Appl. No.: 657,005

[22] Filed: May 28, 1996

Related U.S. Application Data

[63] Continuation of Ser. No. 504,569, Jul. 26, 1995, abandoned, which is a continuation of Ser. No. 324,538, Oct. 18, 1994, abandoned, which is a continuation of Ser. No. 182,662, Jan. 13, 1994, abandoned, which is a continuation of Ser. No. 24,794, Mar. 1, 1993, abandoned, which is a continuation of Ser. No. 859,615, Mar. 23, 1992, abandoned, which is a continuation of Ser. No. 514,549, Apr. 18, 1990, abandoned.

[30] Foreign Application Priority Data

Apr. 20, 1989 [DE] Germany ............... 39 13 001.0

[51] Int. Cl.$^6$ .............. C08L 33/14; C08L 67/00
[52] U.S. Cl. .............. 523/206; 523/523; 524/513; 524/523; 524/533; 524/558; 524/923; 525/223; 525/303
[58] Field of Search .............. 523/206, 523; 524/508, 513, 533, 558, 923; 525/223, 303

[56] References Cited

U.S. PATENT DOCUMENTS

| | | | |
|---|---|---|---|
| 4,324,880 | 4/1982 | Dhein et al. | 528/80 |
| 4,413,084 | 11/1983 | Harvath | 525/450 |
| 4,525,489 | 6/1985 | Hayashi et al. | 524/523 |
| 4,605,720 | 8/1986 | Chattha et al. | 524/923 |
| 4,798,746 | 1/1989 | Claar et al. | 525/223 |
| 4,808,656 | 2/1989 | Kania et al. | 524/558 |
| 5,084,506 | 1/1992 | Faler et al. | 524/923 |
| 5,093,408 | 3/1992 | Jung et al. | 524/558 |

*Primary Examiner*—Tae Yoon
*Attorney, Agent, or Firm*—Schweitzer Cornman Gross & Bondell LLP

[57] ABSTRACT

A non-aqueous dispersion containing, in addition to organic solvents,

A) from 15–85% by weight of a dissolved film-forming component of hydroxyl group- and carboxyl-group containing polyesters, (meth)acrylic copolymers or mixtures thereof in which up to half the molecules may be esterified with 1 molecule of maleic acid each, and B) from 15–85% by weight of a disperse phase of uncross-linked (meth)acrylic copolymers having a hydroxyl number of at least 300, obtainable by the radical polymerization of
  a) from 80–100% by weight of hydroxyalkyl (meth) acrylates and
  b) from 0–20% by weight of other α,β-monounsaturated monomers in the dissolved film-forming component.

15 Claims, No Drawings

HYDROXYL GROUP CONTAINING BINDER, A PROCESS FOR ITS PREPARATION, AND ITS USE

This is a continuing application of U.S. Ser. No. 08/504,569, filed on Jul. 26, 1995; which is a continuation of U.S. Ser. No. 08/324,538, filed on Oct. 18, 1994; which is a continuation of U.S. Ser. No. 08/182,662, filed on Jan. 13, 1994; which is a continuation of U.S. Ser. No. 08/024,794, filed on Mar. 1, 1993; which is a continuation of U.S. Ser. No. 07/859,615, filed on Mar. 23, 1992; which is a continuation of U.S. Ser. No. 07/514,549, filed Apr. 18, 1990, all now abandoned.

BACKGROUND OF THE INVENTION

This invention relates to hydroxyl group-containing binders in the form of a non-aqueous dispersion, to their preparation and to their use for the production of multi-layered coatings. The binders are suitable both for the preparation of base lacquers and for the preparation of clear lacquers.

Non-aqueous dispersions are used in lacquers for increasing the solids content available for processing (both in base lacquers and in clear lacquers) and for improving the processing reliability (in base lacquers and clear lacquers) and the resistance of base lacquers to dissolving, without deleteriously affecting the metallic effect in the lacquer film.

Dispersions are particles of synthetic polymers in an inert liquid in which the polymer is insoluble. Known dispersions are stabilized by means of a polymeric stabilizer. The stabilizer generally contains an (anchoring) component which associates with the particles of the disperse polymer.

The dispersion contains a solvated component which forms a sterically stabilizing shell round the particles. In addition, the stabilizer is covalently bound to the particles of the polymer.

The dispersion contains further functional groups which together with other film-forming resin components (OH functional alkyd, polyester or acrylic resins) may be thermally cross-linked with conventional hardener components (melamine/formaldehyde resin) to form lacquer films.

Such dispersions are described in DE-OS 22 62 463. A stabilizer solution consisting of a precursor and prestabilizer component is used for stabilization. The stabilizer is in addition covalently bound to the disperse phase. The dispersion is prepared in aliphatic hydrocarbons. The solids content of the dispersion is about 45%. It is used together with conventional film-forming HO-functional resins and cross-linker resins in base lacquers and clear lacquers.

Dispersions on the same principle as in DE-OS 22 62 463 are described in DE-OS 28 18 095 and used there with acrylic resins as film-forming components and melamine/formaldehyde resins for base lacquers. The described dispersions are prepared in petroleum hydrocarbons (aliphatic hydrocarbons). The dispersion has a solids content of 52% and the proportion of insoluble microparticles is 31%.

Dispersions containing polyesters as film-forming components in base lacquers are described in DE-OS 28 18 093. The solvents are aliphatic hydrocarbons. The dispersions have a solids content of about 46% and the solids content of the disperse phase is about 28%. According to DE-PS 17 20 417, stabilization of the dispersion is carried out with methylol/melamine resin condensation products which undergo partial cross-linking with the acrylic copolymer. The dispersion is prepared in branched chain aliphatic hydrocarbons. The solids content of the dispersion is maximally 53%. The solids content of the disperse phase is not mentioned.

In DE-PS 22 60 610, an acrylic copolymer in aliphatic/aromatic mixtures (crystal oil) and n-propanol is described as stabilizer solution. The partial cross-linking is carried out with ethylene glycol dimethacrylate. The solids content of the dispersion is 55–60%; the solids content of the disperse phase is distinctly lower.

U.S. Pat. No. 4,525,499 describes a nonaqueous binder dispersion containing a modified vinyl polymer, or copolymer, having a hydroxyl number of between 8 and 140. The binder compositions of that U.S. patent provide acceptable stability only when used with an aliphatic hydrocarbon that is a nonpolar or only slightly polar solvent. Aromatic solvents can be used only to a slight extent lest they impair the stability of the dispersion.

Common to all the dispersions described is that the stability depends on numerous conditions which must all be observed at the same time: Use of a special stabilizer component which must in part be prepared in several stages for synthesis; use of a very limited choice of solvents or, in the case of mixtures, a narrow range of fractions, preferably aromatic hydrocarbons; copolymerisation to form the dispersion with concomitant partial cross-linking of the stabilizer/disperse phase and partial cross-linking in the core must be correctly adjusted to one another.

The aforementioned very limited choice of solvents means that only nonpolar or at most very slightly polar solvents can be employed. Even at that, the slightly polar solvents can be used only in very limited amounts lest they compromise the stability of the dispersion. This excluded from use the preferred group of highly polar solvents.

Slight errors and deviations in the parameters employed in the process of preparation may result in instability of the dispersion.

Examples of these include uncontrolled polymer formation in the process of preparation in the reactor in the region of gas/liquid interfaces, increases in viscosity leading to-loss of the high solid character or the formation of lumps leading to losses in solids content, or thickening or gelling, which may render the dispersion completely unusable.

Another indication that a dispersion is unusable is the undesirable irreversible or, in more favourable cases, reversible settling of the dispersion after prolonged storage.

It is an object of this invention to provide a nonaqueous dispersion which is suitable as hydroxyl group-containing binder, has improved stability in a wide spectrum of solvents conventionally used for lacquers, and can be produced reliably and economically.

This problem is solved by a non-aqueous, hydroxyl group-containing dispersion which is suitable for use as binder and contains, in addition to organic solvents:

A) from 15–85% by weight of film-forming hydroxyl group and carboxyl group-containing polyesters or hydroxyl group- and carboxyl group-containing (meth)acrylic copolymers or mixtures thereof dissolved in the organic solvents, in which polyesters or (meth)acrylic copolymers up to half the molecules thereof may be esterified with one molecule of maleic acid each, and B) from 15–85% by weight of a disperse phase consisting of uncross-linked (meth)acrylic copolymers having a hydroxyl number, calculated as mg of KOH per g of componet B), of at least 300, obtainable by the free radical polymerisation of a) from 80–100% by weight of hydroxyalkyl(meth) acrylates and b) from 0–20% by weight of other $\alpha,\beta$-monounsaturated monomers which react neither with A) nor with a) by polyaddition in the film-forming, dissolved component provided, the sum of components A) and B) and the sum of components a) and b) amounting in each case to 100.

It was discovered that the nonaqueous, hydroxyl group containing dispersion of the present invention overcomes the drawbacks of prior art binders, in that it enables the use also of the preferred group of solvents and solvent systems. The critical feature of the present invention which enables the obtention of this benefit, is the minimum 300 hydroxyl number of the component B. It is this critical feature of the present invention which permits the use of any kinds of solvents, regardless of their polarity, and it is not recognized by the prior art.

Solvent systems having a high polarity, including esters such as a butylacetate, e.g. n-butylacetate, glycol ethers, glycol ether esters, ketones, aromatic hydrocarbons, and alcohols, and mixtures of solvents suitably of highly polar character, are the most suitable solvents that can be used with the present invention. These solvents cannot be used with the nonaqueous binders of the prior art.

For the preparation of the dispersion according to the invention, a solution of

A) from 15-85 parts by weight of film-forming hydroxyl group-containing and/or carboxyl group-containing polyesters or hydroxyl group-containing and/or carboxyl group-containing (meth)acrylic copolymers or mixtures thereof, in which polyesters or (meth)acrylic copolymers up to half the molecules thereof may be esterified with one molecule of maleic acid each, is introduced into the reaction vessel and B) from 15-85 parts by weight of monomers capable of free radical polymerisation are polymerised in this solution.

These radically polymerisable monomers may be present as a mixture of a) from 80-100% by weight, preferably 90-100% by weight of hydroxyalkyl (meth)acrylates and b) from 0-20% by weight, preferably 0-10% by weight of other unsaturated monomers.

The monomers are introduced continuously into the solution of film forming agent present in the reaction vessel and the polymerised therein in the presence of radical initiators.

DETAILED DESCRIPTION OF THE PRESENT INVENTION

The procedure according to the invention provides the advantage of a reliable and economical preparation of the dispersion without the disadvantages inherent in the state of the art. Since no stabilizer component functioning only as stabilizer is used according to the invention but the stabilizer also functions as film-forming phase, additional steps fox synthesizing the stabilizer are eliminated. Furthermore, no compatibility problems with the stabilizer component occur in the lacquer, i.e. there are no levelling problems and structural problems in the lacquer surface and no phase separation. The dispersion obtained is stable to heat and solvent. A dispersion which has partly undergone swelling or solution due to heating reverts to its original state after cooling. The dispersion obtained therefore has greater stability even though preliminary cross-linking is omitted. Dispersions of the present state of the art were dependent on aliphatic solvents, which is no longer the case in the present invention.

The dispersions according to the invention may have a very high solids content of up to about 65% in spite of a low viscosity of from 50 to 500 mPa.s. The disperse (insoluble) phase has a high solids content of about 50%. When the dispersions according to the invention are used, the lacquers obtained have a high stability in storage even at elevated temperatures (for example, in the case of clear lacquers).

The dispersions according to the invention are prepared by the formation of a disperse phase of uncross-linked (meth)acrylic copolymers (component B) in a dissolved film-forming polyester containing hydroxyl and carboxyl or (meth)acrylic copolymer containing hydroxyl and carboxyl groups.

Examples of polyesters suitable as component A) include esterification products of aliphatic and cycloaliphatic polyols and aliphatic, cycloaliphatic and/or aromatic polycarboxylic acids of the kind conventionally used in lacquer technology.

The polyesters used for the preparation of the nonaqueous, hydroxyl group-containing dispersion may, for example, have a hydroxyl number of about 20 to 190, preferably from 50 to 160, and an acid number of, for example, about 5 to 40.

The number average of the molecular weight (Mn) is advantageously about 1000 to 8000, preferably from 2000 to 6000.

The hydroxyl- and carboxyl group-containing (meth)acrylic copolymers which may be used as component A) advantageously have a number average molecular weight (Mn) of about 2000 to 8000. The hydroxyl number may suitably be, for example, from 50 to 160 and the acid number, for example, from 5 to 40. The copolymers are of the type conventionally used for lacquer purposes and may be obtained, for example, by radical copolymersation of $\alpha,\beta$-olefinically unsaturated monomers with acrylic acid, methacrylic acid and derivatives thereof such as esters of aliphatic alcohols containing 1 to 18 carbon atoms. Examples of $\alpha,\beta$- unsaturated monomers include those indicated below for component B).

Up to half the molecules (i.e. up to 50%, based on the number average of the molecular weight), both of the polyester and of the (meth)acrylic copolymer of component A) may be esterified, each with one molecule of maleic acid. Esterification with maleic acid is preferred when the number average of the molecular weight (Mn) o,f the polyester or (meth)acrylate matrix is in the lower region of the range indicated, i.e. for example, from 1000 to 2500 in the case of the polyesters and from 2000 to 6000 in the case of (meth) acrylates. Preferably up to 50% of the molecules are then in the form of the maleic acid ester. The products are preferably in the form of the semi-esters of maleic acid as obtained, for example, by reaction of the hydroxyl group-containing polyester or (meth)acrylate matrix with a quantity of maleic acid anhydride such that not more than half of the molecules can undergo reaction.

The main component of the disperse phase (component B) consists of hydroxyalkylesters of acrylic acid and of methacrylic acid.

The following are examples of suitable hydroxyalkyl esters of acrylic acid or methacrylic acid: $\beta$-Hydroxyethylacrylate, $\beta$-hydroxyethylmethacrylate, $\beta$-hydroxypropylacrylate, $\beta$-hydroxypropylmethacrylate, butane-1,4-diol-monoacrylate, butane-1,4-diol-monomethylacrylate, hexane-1,6-diol-monoacrylate and hexane-1,6-diol-monomethacrylate.

Further examples include reaction products of lactones with hydroxyalkyl(meth)acrylates such as TONE-M 100(R) and reaction products of compounds containing glycidyl groups such as CARDURA E10(R) with (meth)acrylic acid.

Examples of suitable monomers include α,β-olefinically unsaturated compounds, such as the following: Methyl acrylate, methyl methacrylate, ethyl acrylate, ethyl methacrylate, isopropyl methacrylate, tert.-butyl acrylate, n-butyl acrylate, n-butyl methacrylate, isobutyl acrylate, isobutyl methacrylate, cyclohexyl methacrylate, trimethyl cyclohexyl methacrylate, 2-ethyl hexyl acrylate, 2-ethyl hexyl methacrylate, lauryl acrylate, lauryl methacrylate, stearyl acrylate, stearyl methacrylate, styrene, α-methylstyrene, o-, m- and p-methylstyrene, p-tert.-butylstyrene, vinyl acetate, vinyl propionate, acrylamide, methacrylamide and acrylonitrile.

Preparation of the non-aqueous, hydroxyl group-containing dispersion according to the invention is carried out by tree radical polymerisation.

The binder matrix containing hydroxyl groups and carboxyl groups (polyester and/or (meth)acrylic copolymer) is introduced in a solvated (dissolved) form into the reaction vessel and heated to the reaction temperature and the monomer/initiator mixture of the disperse phase is continuously added, e.g. in the course of 2 to 8 hours, preferably 2 to 6 hours.

In the case of semi-ester formation with maleic acid, the appropriate quantity of maleic acid anhydride is added before addition of the monomer/initiator mixture and esterification is carried out by heating, for example to 100°–120° C.

Polymerisation is carried out at temperatures of, for example, from 60° C. to 160° C., preferably from 100° C. to 130° C.

The polymerisation reaction may be started with conventional polymerisation initiators. Per compounds and azo compounds which decompose into their radicals by heat in a first order reaction are suitable initiators. The type and quantity of initiator are chosen so that the amount of free radicals available at the polymerisation temperature remains as constant as possible during the inflow phase.

The following are preferred initiators for free radical polymerisation: Dialkyl peroxides such as di-tert.-butyl peroxide and dicumyl peroxide; diacyl peroxides such as dibenzoyl peroxide and dilauryl peroxide; hydroperoxides such as cumene hydroperoxide and tert.-butyl hydroperoxide; per esters such as tert.-butyl-perbenzoate, tert.-butyl-perpivalate, tert.-butyl-per-3,5,5-trimethylhexanoate and tert.-butyl-per-2-ethylhexanoate; peroxy dicarbonates such as di-2-ethyl hexyl-peroxydicarbonate and dicyclohexyl-peroxydicarbonate; perketals such as 1,1-bis-(tert.-butylperoxy)-3,5,5-trimethylcyclohexane and 1,1-bis-(tert.)-butylperoxy)-cyclohexane; ketone peroxides such as cyclohexanone peroxide and methyl isobutyl ketone peroxide; and azo compounds such as 2,2'-azo-bis(2,4-dimethylvaleronitrile), 2,2'-azo-bis(2-methylbutyronitrile), 1,1'-azobis(cyclohexane carbonitrile) and azo-bis-isobutyronitrile.

The polymerisation initiators, in particular the per-esters, are generally added in a quantity of from 0.1 to 3% by weight, based on the initial weight of the monomers introduced.

The preparation of component B) is carried out in a solution of component A) in an organic solvent. The solvents used for dissolving or solvating the binder matrix (component A) may, for example, be the same as those later used for the coating compounds prepared from the binder dispersions according to the invention. These may be conventional organic solvents, e.g. glycol ethers such as ethylene glycol dimethylether; glycol ether esters such as ethyl glycol acetate, butyl glycol acetate, 3-methoxy-n-butyl acetate, butyl diglycol acetate, ethoxypropyl acetate or methoxypropyl acetate; esters such as methyl acetate, ethyl acetate, butyl acetate, isobutyl acetate or amyl acetate; ketones such as methyl ethyl ketone, methyl isobutyl ketone, diisobutyl ketone, cyclohexanone and isophorone; aromatic hydrocarbons such as toluene, o-, m- and p-xylene, ethylbenzene and SOLVESSO 100(R) (mixtures of aromatic hydrocarbons boiling in the range of from 153° to 180° C.). A certain proportion of alcohols such as methanol, ethanol, n-propanol, isopropanol, n-butanol, isobutanol, sec.-butanol, tert.-butanol and hexanol, 2-ethylhexanone and aliphatic hydrocarbons such as heptane and White Spirit(R) (mineral spirits boiling in the range of from 144°–165° C.) may be used together with the abovementioned solvents.

Chain transferring agents may be used for the preparation of component B) in component A) for regulating the molecular weight. Conventional chain transferers such as mercaptans, thioglycollic acid esters and chlorinated hydrocarbons are suitable for this purpose.

The polymerisation conditions (reaction temperature dosing time of the monomer mixture, type and quantity of initiator, concentration of solution, composition of solvents) are chosen so that trouble-free formation of the polymer microparticles is obtained.

The particle size of the disperse phase, determined by Photon Correlation Spectroscopy, is preferably in the range, of from 50 to 1000 nm, most preferably from 200 to 500 nm.

The disperse phase of the non-aqueous, hydroxyl group-containing dispersion prepared according to the invention generally exists in a glass transition temperature range of from $-40°$ C. to $+60°$ C., calculated from the glass transition temperature of the homo polymers of the individual monomers as indicated in the literature (FOX equation).

The non-aqueous dispersions according to the invention are suitable for use as binders for coating compounds of the type used, for example, as base lacquers or clear lacquers for the production of multilayered coatings, in particular in the construction of motor vehicles.

Such coating compounds contain, in addition to the binders according to the invention, a cross-linking agent suitable for cross-linking the hydroxyl groups and carboxyl groups of the film forming agent. Conventional cross-linking agents capable of reacting with hydroxyl groups and carboxyl groups are suitable. For example, the non-aqueous, hydroxyl group-containing dispersion prepared according to the invention may be used in combination with amine resins as cross-linking agents.

Suitable amine resins include, for example, alkylated condensates prepared by the reaction of amino triazines and amido triazines with aldehydes. According to known technical processes, compounds containing amino or amido groups such as melamine, benzoguanamine dicyandiamide urea or N,N'-ethylene urea are condensed with aldehydes, in particular formaldehyde, in the presence of alcohols such as methyl, ethyl, propyl, isobutyl, n-butyl or hexyl alcohol. The reactivity of such amine resins is determined by the degree of condensation, the ratio of the amine or amide components to formaldehyde and the nature of the etherifying alcohol used.

The ratio by weight of the non-aqueous, hydroxyl group-containing dispersion used according to the invention to the amine resin is from 80:20 to 60:40.

Conventional additives and auxiliary agents for lacquers may be added to the non-aqueous dispersions according to the invention when worked up for the preparation of coating compounds. These additives and auxiliary substances are chosen according to the envisaged use purpose of the lacquers to be produced.

The solvents present in the coating compounds containing the non-aqueous, hydroxyl group-containing dispersions to be used according to the invention may, for example, be the same solvents as those used for the preparation of the dispersions. Other solvents may be added to these solvents. Suitable examples of solvents are the same as those previously described for the preparation of the dispersions.

In addition, coating compounds based on the dispersions according to the invention may contain conventional auxiliary agents for lacquers, such as levelling agents based on, for example, (meth)acrylic homopolymers, cellulose esters or silicone oils; plasticizers based e.g. on esters of phosphoric acid, phthalic acid or citric acid; anti-settling agents such as montmorillonite, pyrogenic silicon dioxide, hydrogenated castor oil and hardening accelerators for the reaction of the non-aqueous, hydroxyl group-containing dispersion according to the invention with amine resin, e.g. phosphoric acid, phosphoric acid esters, dicarboxylic acid semi-esters and citric acid.

Pigments and fillers are used for the preparation of coating compounds for base lacquer layers containing the non-aqueous, hydroxyl group-containing dispersions according to the invention. The usual transparent or covering, inorganic and/or organic colour pigments conventionally used for lacquers are suitable.

For obtaining brilliant polychromatic metallic effects it is preferred to use aluminium pigments prepared from highly pure aluminium (99.99%) together with transparent inorganic or organic pigments.

Pigments with a pearly gloss may be used for obtaining decorative effects.

For the preparation of multi-layered lacquer coats using the hydroxyl group-containing binders according to the invention, these binders may be contained in base lacquers, as already mentioned above by way of example. Such base lacquer layers may be covered with clear lacquer top coat layers. The clear lacquers used for this purpose may, for example, also contain the hydroxyl group-containing binders according to the invention although conventional transparent lacquers may be used for the top coats, e.g. commercially available stoving lacquers which can be diluted with solvents and are based on hydroxyl group-containing acrylate resins cross-linked with ordinary commercial melamine formaldehyde resins, or clear stoving lacquers containing organic polymer microgel particles from 0.01 to 2 μm in diameter and cross-linked with melamine formaldehyde resins; or clear stoving lacquers containing inorganic micro particles from 0.015 to 60 μm in diameter adapted in their refractive index to the binder used; or water dilutable clear stoving lacquers; or clear two-component acrylic lacquers cross-linked with isocyanates.

PREPARATION OF THE POLYESTER FOR EXAMPLE 1

156.0 g (1.5 mol) of neopentyl glycol, 80.4 g (0.6 mol) of trimethylolpropane and 94.4 g (0.8 mol) of hexane-1,6-diol are weighed into a reaction vessel equipped with heating means, stirrer, column of filling bodies, distillation bridge and descending condenser and thermometer for measuring the temperature of the reaction mixture and of the head of the column, and the components are melted at 80° C. 166.0 g (1 mol) of isophthalic acid and 248.2 g. (1.7 mol) of adipic acid are then added, heated to 240° C. at a rate of 20 degrees centigrade per hour with stirring and condensed at this temperature until an acid number of 17 mg of KOH/g is obtained.

The reaction mixture is then cooled to 120° C. and diluted to a solids content of 70% with n-butyl acetate.

The polyester resin has the following data: Solids content=70.8%, viscosity=2425 mPa.s at 25° C., acid number=15.0 mg KOH/g, OH number=102 mg KOH/g, number average molecular weight (Mn)=1900.

PREPARATION OF THE POLYESTER FOR EXAMPLE 2

260.0 g (2.5 mol) of neopentyl glycol and 80.4 g (0.6 mol) of trimethylolpropane are weighed into the apparatus described above and melted at 118° C. 149.4 g (0.9 mol) of isophthalic acid, 133.2 g (0.9 mol) of phthalic acid anhydride and 189.8 g (1.3 mol) of adipic acid are then added and heated to 240°C. at a rate of 20 degrees centigrade per hour with stirring and condensed at this temperature until an acid number of 32 mg KOH/g is obtained.

The reaction mixture is then cooled to 120° C. and diluted to a solids content of 65% with xylene.

The polyester resin has the following data: Solids content=65.1%, viscosity=1200 mPa.s at 25° C., acid number=28.1 mg KOH/g, OH number=75 mg KOH/g, number average molecular weight (Mn)=1300.

PREPARATION OF (METH)ACRYLIC COPOLYMER FOR EXAMPLE 3 AND EXAMPLE 4

380 g of xylene and 20 g of isobutanol are introduced into a 2-l three-necked ground glass flask equipped with stirrer, contact thermometer, spherical condenser and dropping funnel and heated to 127° C. with stirring and with reflux cooling switched on.

A mixture of 5 g of acrylic acid, 75 g of 2-hydroxy-ethyl methacrylate, 160 g of n-butyl acrylate, 260 g of methyl methacrylate and 3 g of tert.-butyl perbenzoate is continuously added from the dropping funnel in the course of 5 hours. The temperature rises to 129° C. towards the end of the inflow time.

When all the components have been introduced, the dropping funnel is rinsed with 40 g of xylene and the rinsings are added to the reaction mixture.

After-polymerisation is then carried out for 5 hours at 127° to 129° C. so that conversion is over 99%.

The polymer is then cooled to 60° C. and diluted with 57 g of xylene.

The (meth)acrylic copolymer has the following data: Solids content=50.3%, viscosity=1540 mPa.s, acid number= 8.6, OH number=65 mg KOH/g, number average molecular weight (Mn)=4500.

EXAMPLES 1–4

(Preparation of Dispersions)

Component I (for composition and quantities see Table 1) is introduced into a 2-litre three-necked, ground glass flask equipped with stirrer, contact thermometer, spherical condenser and dropping funnel and component I is heated to 115° C. with stirring.

Component II (mixture of monomers, solvent and initiator) is continuously added from a dropping funnel within the given dosing time while the temperature is kept constant at 115° C.

At the end of the inflow time, the dropping funnel is rinsed with component III (solvent) and the solvent is added to the reaction mixture.

Component IV (initiator) is then added and after-polymerisation is carried for 2 hours at 115° C. so that conversion is over 99%.

The polymer is then diluted with component V and cooled to 60° C.

TABLE 1

(Initial weight in Gramm)

| Constit-uents: | Component: | Examples: | | | |
|---|---|---|---|---|---|
| | | 1 | 2 | 3 | 4 |
| I | Polyester for Example 1 A) | 214 | — | — | — |
| | Polyester for Example 2 A) | — | 500 | — | — |
| | (Meth)acrylic copolymer A) | — | — | 300 | 500 |
| | Maleic acid anhydride | — | 6 | — | — |
| | n-Butyl acetate | — | 70 | 140 | 20 |
| | Xylene | 136 | 75 | — | — |
| II | 2-Hydroxyethylacrylate B) | 493 | 264 | 393 | — |
| | 2-Hydroxyethylmeth-acrylate B) | — | — | — | 294 |
| | n-Butyl acetate | 100 | 35 | 100 | 100 |
| | Tert.-butylperoctoate | 6 | 4 | 6 | 5 |
| III | n-butylacetate | 30 | 25 | 30 | 30 |
| IV | Tert.-butylperoctoate | 1 | 1 | 1 | 1 |
| V | n-Butylacetate | 20 | 20 | 30 | 50 |
| Σ | | 1000 | 1000 | 1000 | 1000 |
| Dosing time for Constituent II | | 5 h | 2.5 h | 4 h | 3 h |
| Data: | | | | | |
| Solids content (%): | | 64.7% | 59.8% | 55.2% | 55.5% |
| Viscosity (mpa · s at 25° C.) | | 430 | 250 | 235 | 350 |
| Acid number (based on solid resin) | | 9.3 | 25.2 | 7.9 | 5.8 |

EXAMPLE 5

Preparation of a Base Lacquer

The proportions given as parts in this Example are parts by weight.

37.0 Parts of the dispersions of the above Examples 1 to 4 are mixed with 18.0 parts of cross-linking agent consisting of a 55–72% solution in butanol of a melamine formaldehyde resin etherified with methanol or butanol or isobutanol.

The cross-linking ratio in terms of the solids content of the dispersion to the solids content of the melamine resin is 70:30 parts by weight.

9 Parts of a rheology paste having a solids content of 5% of an organic derivative of a Smektite (organically modified laminar silicate) dispersed in a mixture of 90 parts of xylene, 2.5 parts of n-butanol and 2.5 parts of a wetting agent based on a salt of a relatively high molecular weight polycarboxylic acid are stirred together with the above-mentioned mixture of binder and cross-linking agent for 15–20 minutes.

3 Parts of a carbamic acid resin based on butyl urethane and formaldehyde are added to the resulting mixture and the mixture is stirred.

A paste of 7.5 parts of a surface-treated, medium fine aluminium powder (62% in mineral spirits) is dispersed with 8.0 parts of n-butyl acetate and 1.5 parts of butyl glycol ester with stirring to form an agglomerate free dispersion and stabilized with 16.0 parts of a 15% solution of a cellulose acetate butyrate having a butyryl content of 38.4%, an acetyl content of 13% and a hydroxyl content of 1.4%. 33.0 Parts of the paste obtained are added with stirring to 67.0 parts of the above mixture.

After the resulting metallic primer coating has been adjusted to a spraying viscosity of 30 seconds ISO with a solvent mixture of 40 parts of butyl acetate and 60 parts of xylene, the solids content obtained (1 hour 120° C.) is 33% or 31%, depending on the micro gel of Examples 1 to 4 used.

| | Examples of formulation | | | |
|---|---|---|---|---|
| | 1 | II | III | IV |
| Dispersion | | | | |
| Example 1 | 37.0 | — | — | — |
| Example 2 | — | 37.0 | — | — |
| Example 3 | — | — | 37.0 | — |
| Example 4 | — | — | — | 37.0 |
| Melamine resin | 18.0 | 18.0 | 18.0 | 18.0 |
| Rheology paste | 9.0 | 9.0 | 9.0 | 9.0 |
| Carbamic acid resin | 3.0 | 3.0 | 3.0 | 3.0 |
| Paste with Al powder | 33.0 | 33.0 | 33.0 | 33.0 |
| Solids content at 30 sec. ISO (%) | 33.0 | 31.0 | 32.0 | 31.0 |

EXAMPLE 6

Preparation of a Base Lacquer

The procedure was the same as in Example 5. A mixture of the dispersion from Examples 1 to 4 with a branched polyester resin containing OH groups of Examples of Preparation 1 and 2 for polyesters was used in a mixing ratio of 9 parts by weight of dispersion to 1 part by weight, based on the solids content of the mixing partners.

Iron phosphate-treated steel sheets were primed with a conventional electro-dip lacquer, stoved and coated with conventional lacquer stoving fillers. These were also stoved in. The base lacquers from Examples 5 and 6 were applied to these pretreated steel sheets with a spray pressure of 5 bar to form a film having a dry film thickness of from 10–15 μm. After exposure to air for 10 minutes, a transparent top coat layer was applied in a thickness of 40 μm. After further exposure to air, storage was carried out at 130° C. for 30 minutes.

The resulting coatings had excellent gloss, good mechanical properties and high resistance to weathering. The metallic effect obtained with a high processing solids content was excellent.

We claim:

1. A hydroxyl group-containing binder in the form of a non-aqueous dispersion of microparticles comprising in addition to one or more organic solvents:
   A) from 15–85% by weight of a film-forming hydroxyl and carboxyl group-containing polyester, or a hydroxyl and carboxyl group containing (meth) acrylic copolymer or a mixture thereof dissolved in said organic solvents, up to half of the polyester or (meth) acrylic copolymer molecules being optionally esterified with one molecule of maleic acid, and
   B) from 15–85% by weight of a disperse phase of an unicross-linked (meth)acrylic copolymer having a hydroxyl number calculated as mg of KOH per gram of component B of at least 300 obtainable by the free radical polymerization of
      (a) from 80–100% by weight of hydroxyalkyl (meth) acrylate and
      (b) from 0–20% by weight of another α,β-mono-unsaturated monomer which reacts with neither A)

nor (a) by polyaddition in the film-forming dissolved component A), wherein the sum of components A) and B) and the sum of components (a) and (b) amount in each case to 100% by weight.

2. Hydroxyl group-containing binder according to claim 1, characterised in that component A) has a number average molecular weight Mn of from 1000 to 8000, up to 50% of the molecules being each esterified with one molecule of maleic acid.

3. Hydroxyl group-containing binder according to claim 1, characterised in that component A) has a number average molecular weight Mn of from 2000 to 8000 and none of the molecules is esterified with maleic acid.

4. Hydroxyl group-containing binder according to claim 1, characterised in that component B) was obtained exclusively from hydroxyalkyl(meth)acrylates.

5. Hydroxyl group-containing binder according to claim 1, characterised in that the hydroxyalkyl(meth)acrylates used were β-hydroxyethylacrylate or β-hydroxyethylmethacrylate or mixtures thereof.

6. Process for the preparation of a non-aqueous dispersion of microparticles containing hydroxyl groups wherein a solution of A) from 15–85 parts by weight of film forming polyesters containing hydroxyl and/or carboxyl groups or (meth)acrylic copolymers containing hydroxyl and/or carboxyl groups or mixtures thereof are introduced into the reaction vessel in organic solvents, in which polyesters or (meth)acrylic copolymers up to half the molecules thereof may be esterified each with one molecule of maleic acid, and B) from 15–85 parts by weight of a mixture of
   a) from 80–100% by weight of hydroxyalkyl (meth)acrylates and
   b) from 0–20% by weight of other α,β-unsaturated monomers which react neither with A) nor with a) by polyaddition, are continuously reacted therein in the presence of free radical initiators, the sum of components A) and B) and of components a) and b) amounting in each case to 100% by weight and the B) forms uncrosslinked microparticles having a hydroxyl number of at least 300.

7. The hydroxyl group containing binder of claim 1, wherein said solvent is an ester, glycol ether, ketone, aromatic hydrocarbon, or alcohol.

8. The hydroxyl group containing binder of claim 7, wherein said ester is a glycol ether ester, methyl acetate, butyl acetate, isobutyl acetate, or amyl acetate.

9. The hydroxyl group containing binder of claim 8, wherein said glycol ether ester is ethyl glycol acetate, butyl glycol acetate, butyl diglycol acetate, 3-methoxy-n-butyl acetate, ethoxypropyl acetate, or methoxypropyl acetate.

10. The hydroxyl group containing binder of claim 7, wherein said glycol ether is ethylene glycol dimethylether.

11. The hydroxyl group containing binder of claim 7, wherein said ketone is methyl ethyl ketone, methyl isobutyl ketone diisobutyl ketone, cyclohexanone, or isophorone.

12. The hydroxyl group containing bonder of claim 7, wherein said ketone is toluene o-, m-, and p-xylene, ethylbenzene, and a mixture of aromatic hydrocarbons having a boiling point between 135° C. and 180° C.

13. The hydroxyl group containing binder of claim 7, wherein the alcohol solvent is used together with another polar solvent, and wherein the alcohol is methanol, n-propanol, isopropanol, n-butanol, isobutanol, sec.-and tert.- butanol, or hexanol.

14. The hydroxyl group containing binder of claim 7, wherein the polar solvent further contains as additional solvent 2-ethylhexanone, or an aliphatic hydrocarbon.

15. The hydroxyl group containing binder of claim 14, wherein said aliphatic hydrocarbon is heptane, or White Spirits.

* * * * *